United States Patent
Schnell

[19]

[11] Patent Number: 5,833,569
[45] Date of Patent: Nov. 10, 1998

[54] GEARED DRIVE UNIT FOR IMPARTING MOTION TO A LOAD

[76] Inventor: Adolf Schnell, Reichswaldallee 19, D-40472 Dusseldorf, Germany

[21] Appl. No.: 832,752

[22] Filed: Apr. 4, 1997

Related U.S. Application Data

[63] Continuation of Ser. No. 410,068, Mar. 24, 1995, Pat. No. 5,655,988.

[30] Foreign Application Priority Data

Mar. 26, 1994 [DE] Germany ............................ 44 10 401.4

[51] Int. Cl.[6] .................................................. F16H 57/08
[52] U.S. Cl. .............................. 475/341; 475/342; 901/25
[58] Field of Search ...................................... 475/341, 342, 475/149, 900; 901/25

[56] References Cited

U.S. PATENT DOCUMENTS

| | | | |
|---|---|---|---|
| 3,258,995 | 7/1966 | Bennett et al. ........................... | 475/342 |
| 3,304,804 | 2/1967 | Oldfield et al. .......................... | 475/341 |
| 3,857,301 | 12/1974 | Hanks et al. ............................. | 475/342 |
| 4,015,721 | 4/1977 | Scheler ..................................... | 901/25 |
| 4,911,033 | 3/1990 | Rosheim et al. ......................... | 475/341 |
| 4,922,790 | 5/1990 | Abbott et al. ............................ | 475/341 |
| 5,355,743 | 10/1994 | Tesar ........................................ | 475/341 |

FOREIGN PATENT DOCUMENTS

| | | |
|---|---|---|
| 0 388 207 a2 | 9/1990 | European Pat. Off. . |
| 446842 | 1/1950 | Italy ...................................... 475/342 |
| 2024984 | 1/1980 | United Kingdom . |

OTHER PUBLICATIONS

Search Report issued Jun. 21, 1996 with respect to European Application 95104107.8.

*Primary Examiner*—Charles A. Marmor
*Assistant Examiner*—Sherry Lynn Estremsky
*Attorney, Agent, or Firm*—Alix, Yale & Ristas, LLP

[57] ABSTRACT

A drive train for transmitting torque produced by a motor to a load comprises a planetary gear arrangement mounted concentrically with respect to a tubular shaft. The planetary gear arrangement cooperates with a pair of driven gears which are also coaxial with the tubular shaft, the planetary gear arrangement and the pair of gears being located within an outer housing. The tubular shaft provides an unobstructed, large diameter passage through the drive train, the passage being available for the routing to a load connected to one of the driven gears of movable shafts, conduits or electrical conductors.

18 Claims, 3 Drawing Sheets

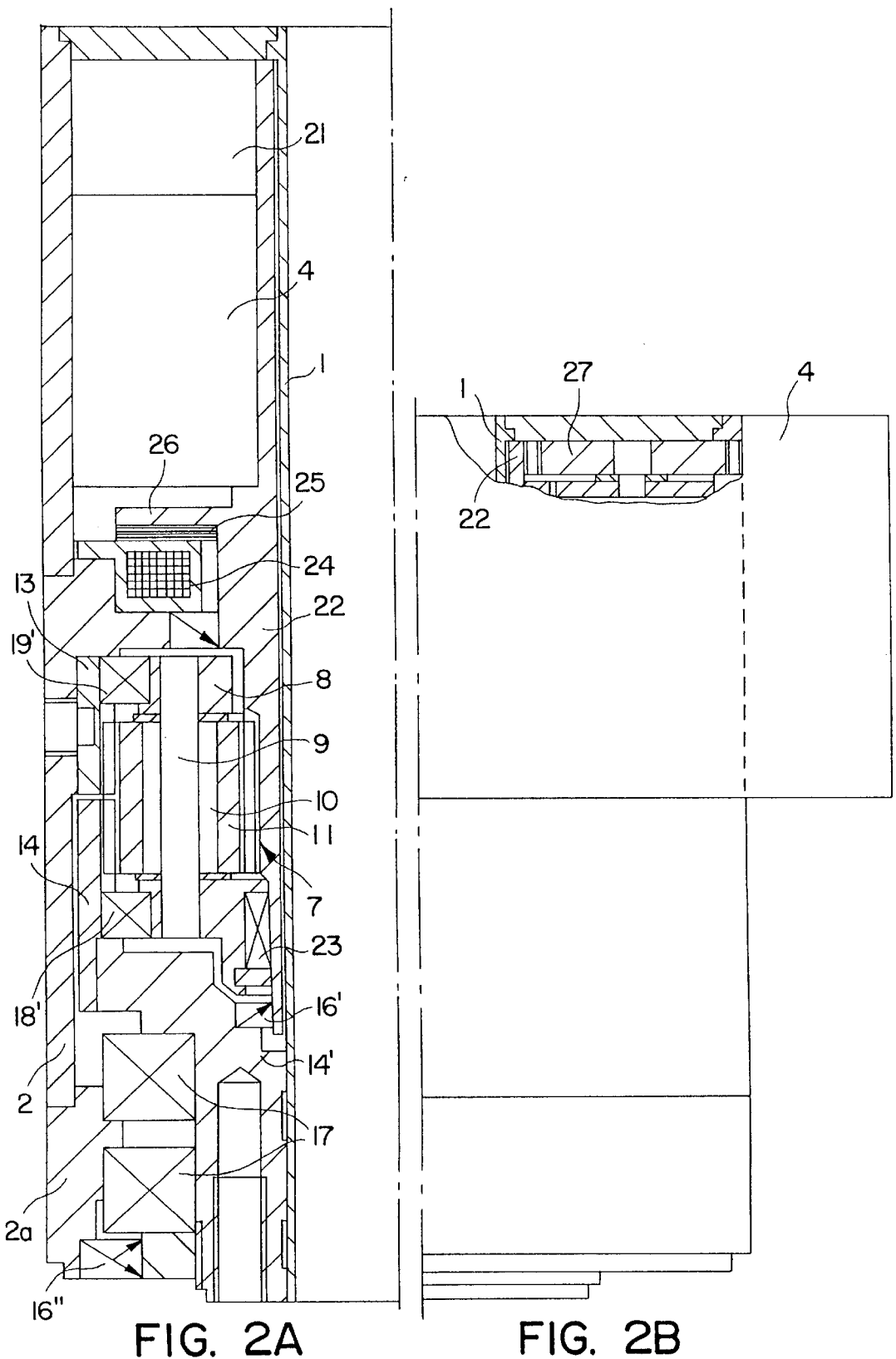

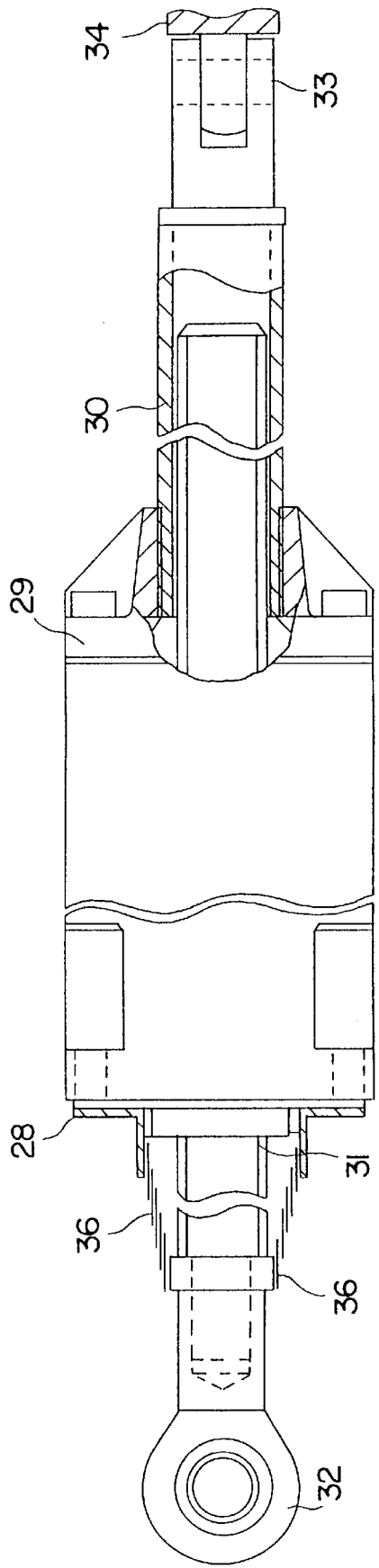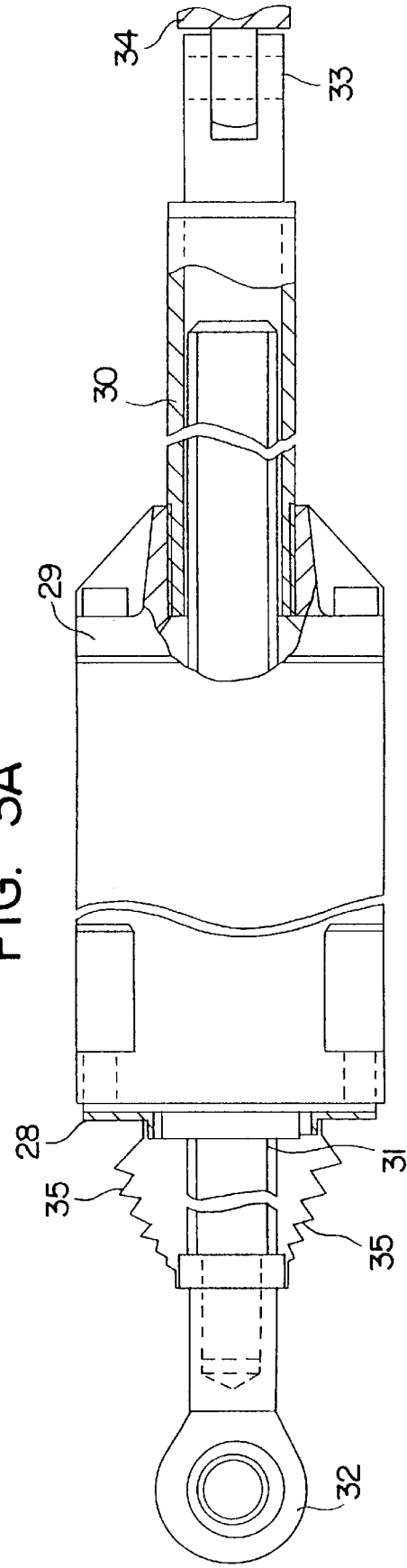

GEARED DRIVE UNIT FOR IMPARTING MOTION TO A LOAD

This is a continuation of application Ser. No. 08/410,068, filed on Mar. 24, 1995, now U.S. Pat. No. 5,655,988.

BACKGROUND OF THE INVENTION

1. Field of the Invention

The present invention relates to the transmission of power from a drive motor, the motor having a rotatable output shaft, to a tool or other load and, particularly, to the mechanical imparting of rotary power to a tool while simultaneously supplying electrical power and/or hydraulic or pneumatic fluid to the tool. More specifically, this invention is directed to a mechanical drive characterized by volumetric efficiency and especially to a drive system comprising a planetary gear unit which is arranged concentrically with respect to a hollow shaft. Accordingly, the general objects of the present invention are to provide novel and improved methods and apparatus of such character.

2. Description of the Prior Art

The present invention relates to a class of power generation and transmission devices known in the art as "geared motors". While not limited thereto in their utility, such devices are particularly well suited for use in robotic applications where they are often referred to as "hand gears" and are employed to move tools such as, for example, for the purpose of gripping, welding, deburring, applying adhesive, painting, etc. In such applications the geared motor, i.e., the torque generator and associated drive train, causes the tool to rotate about an axis of rotation, which typically will be angularly related with respect to the axis of rotation of the output shaft of the motor which generates the torque, and to also to function as a "wrist joint" to pivot the tool about a swivel axis. The swivel axis will customarily be oriented transversely with respect to the axis about which the tool is rotated. In other words, an objective in the design of many geared motors is to simulate the movements an operator would, if present, impart to the tool thus permitting the tool to function where a human operator can not be present because of space or environmental restrictions.

It is common practice to include, in a geared motor, an overload clutch between the rotatable load, i.e., the driven tool, and the output of the drive train. The provision of such an overload clutch normally ensures a rigid connection between the tool and geared motor unit while defining a flexible connection which prevents damage due, for example, to the tool colliding with a workpiece. In order to deliver electrical power to the clutch and/or pressurized hydraulic or pneumatic fluid to the tool being manipulated, means must be provided for routing electrical conductors and/or conduits through the geared motor unit. By way of example, if the geared motor unit is employed to manipulate a spray paint nozzle, the conduit for delivering the paint to the nozzle should desirably be routed through the geared motor unit. There are also instances where it would be desirable to provide an auxiliary tool drive at the end of a robotic arm without physically loading the hand gear with the additional weight of the motor of the auxiliary drive. This, however, would require the provision of some means for delivering longitudinal or rotary motion through the geared motor unit to the tool. The prior art has not offered a satisfactory solution, and particularly a volumetrically efficient solution, for establishing a path for the delivery of power and/or operating fluid through a geared motor or hand gear.

SUMMARY OF THE INVENTION

The present invention overcomes the above-briefly discussed and other deficiencies and disadvantages of the prior art and, in so doing, provides a novel drive train with a centrally disposed lead-through by which conduits for pressurized fluid and/or conductors for electrical power or a drive shaft may be routed.

Apparatus in accordance with a preferred embodiment of the invention comprises a drive motor having its output shaft mechanically coupled to a Wolfrom planetary gear unit. The planetary gear unit is arranged concentrically about a hollow shaft, i.e., a tubular inner housing member, and is located between an outer housing and the hollow shaft. The planetary gear unit includes a planet carrier mounted for rotation about the shaft. The drive train of the invention also includes a pair of internal gears which are engaged with planet wheels of the planetary gear unit. One of these internal gears functions as the output gear of the drive train of the geared motor unit.

BRIEF DESCRIPTION OF THE DRAWINGS

The present invention may be better understood, and its numerous objects and advantages will become apparent to those skilled in the art, by reference to the accompanying drawing wherein like reference numerals refer to like elements in the several figures and in which:

FIGS. 2A and 2B are views of, partly schematic and partly in section, of second embodiment of the present invention and a modification thereof; and FIGS. 3a and 3b a are schematic side elevation views, partly in section, of a lifting gear which embodies the present invention and a modification thereof.

DESCRIPTION OF THE DISCLOSED EMBODIMENTS

Figure 1:
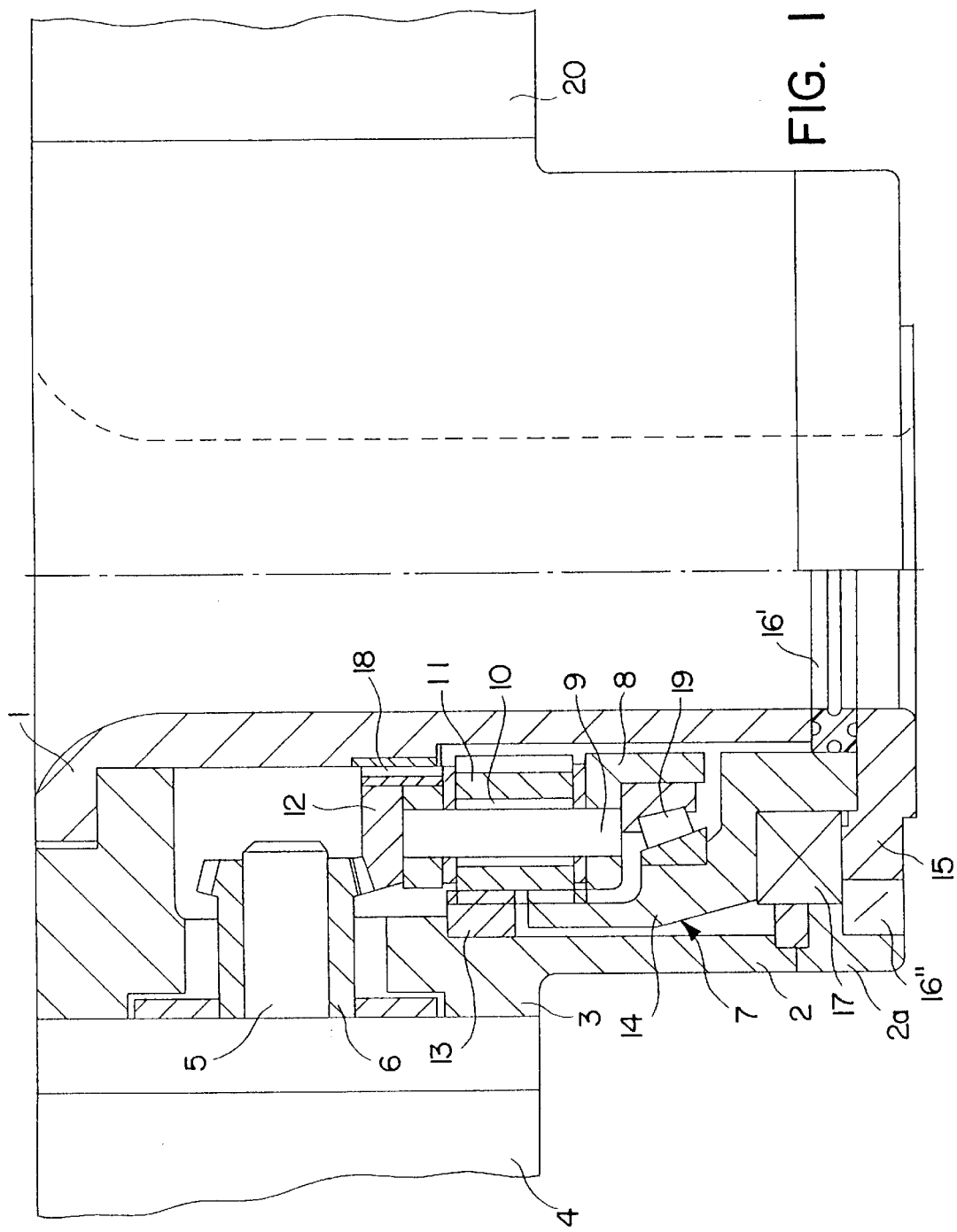
FIG. 1 is a schematic, partial, side-elevation view, partly in section, of a hand gear unit for a robot arm which includes a first embodiment of the present invention.

With reference to FIG. 1, a dual axis hand gear unit for use on a robot arm comprises a hollow, open-ended shaft 1. The axis of shaft 1, indicated by means of a broken line, defines the axis of rotation of the output of the drive train of FIG. 1. Shaft 1 is disposed within, and connected to, an outer casing 2, i.e., shaft 1 and casing 2 define a generally annular shaped housing. Casing 2, in the disclosed embodiment has substantially the shape of a hollow cylinder. Casing 2 is provided, at its lower end, with a cover ring 2a. In the FIG. 1 embodiment the shaft 1 is stationary relative to casing 2. Casing 2 is provided with a lateral flange 3. A drive motor 4 is affixed, by any suitable means, to flange 3. Drive motor 4 has a rotatable output shaft 5, the axis of rotation of shaft 5 being oriented generally transversely with respect to the axis of rotation of the drive train itself. A bevelled pinion gear 6 is keyed or otherwise mechanically connected to motor output shaft 5 for rotation therewith.

The drive train depicted in FIG. 1 includes a five-wheeled or Wolfrom planetary gear unit which has been indicated generally at 7. Gear unit 7 is a helical planetary drive comprising a planet carrier 8. Carrier 8 supports a pair of planet wheel pins 9, only one of which is shown, which are offset by 180° and extend coaxially with respect to shaft 1. A planet wheel 11, mounted in needle bearings 10, is supported on each of pins 9. Planet carrier 8 is also provided with a beveled input or drive gear 12 which engages the bevelled pinion 6 on motor output shaft 5. Accordingly, planet carrier 8 is driven by motor 4 via meshed gears 6 and 12.

A pair of gears 13 and 14 are received in the housing defined by shaft 1 and casing 2. Gears 13 and 14 are coaxial with one another and with hollow shaft 1. Internal gear 13 is affixed to casing 2 and is thus "stationary". Both of gears 13 and 14 mesh with the planet wheels 11.

Internal gear 14 serves as the output of the drive train. Gear 14 thus includes a stepped extension which carries a mounting flange 15, the mounting flange being located on one end face of the gear unit. Mounting flange 15 serves as a support for a tool or an overload limiter such as a clutch. Inner and outer seals 16' and 16" are fitted between the mounting flange 15 and, respectively, the hollow shaft 1 and the casing 2. Gear 14 is mounted without play in casing 2. In the embodiment being described, this mounting has schematically been illustrated as an axially and radially acting bearing arrangement 17.

In the region of the bevel gear 12 the planet carrier 8 is supported relative to shaft 1 by means of a needle bearing 18. At its opposite end, the planet carrier 8 is positioned relative to gear 14 by means of a tapered roller bearing 19.

The above-described design is extremely compact and thus allows an internal passage, defined by hollow shaft 1, of comparatively large diameter while, at the same time, the hand gear unit has a comparatively small overall diameter. Also, the above-described arrangement can provide a sufficiently high output torque while, by virtue of the high gear reduction ratio of the five-wheel planetary gear unit 7, permitting extremely accurate positioning of the load coupled to flange 15. The reduction ratio of the Wolfrom planetary gear unit 7 may, for example, be 100:1.

The embodiment of FIG. 1, as will be obvious to those skilled in the art, can be practiced without, the use of the directly coupled drive motor 4. For example, shaft 5 could be driven from a remotely located torque generator via a suitable belt drive.

Continuing to refer to FIG. 1, a swivel drive for the "wrist" joint of the disclosed gear unit is indicated schematically at 20. Swivel drive 20 may be in the form of either a directly coupled drive motor or some other suitable drive mechanism such as, for example, a belt drive. The swivel drive 20 acts on casing 2 to cause the gear unit housing to rotate about an axis, for example the axis of drive shaft 5, which is oriented transversely with respect to the axis of shaft 1.

FIG. 2 depicts a second embodiment of the invention and a modified form thereof. Considering the unit shown, drive motor 4 is an AC servo ring motor which, together with its associated resolver 21, is received in housing 2. Those of ordinary skill will readily appreciate that FIG. 3 depicts drive motor 4 as a ring-shaped motor which is disposed coaxially with open-ended shaft 1. While FIG. a depicts an embodiment wherein housing 2 encloses drive motor 4, it will be appreciated that FIG. 2*b* illustrates an embodiment wherein motor 4 is mounted on the exterior of housing 2 at one end thereof such that ring-shaped drive motor 4 is oriented coaxially to shaft 1. In the manner known in the art, resolver 21 transmits signals commensurate with the angle of twist and the speed of rotation of motor 4 to a control system, not shown, and delivers command signals to the motor. Regardless of whether drive motor 4 is mounted interiorly or exteriorly of housing 2, the rotatable output member of drive motor 4 is directly coupled to a hollow pinion 22. Pinion 22 is mounted, for example by means of needle bearings (not shown), on hollow shaft 1. Pinion 22 engages the planet wheels 11 of the Wolfrom planetary gear unit 7 and thus drives the five-wheel planetary gear unit.

In the arrangement depicted FIG. 2*a*, the planet carrier 8 is mounted relative to the two internal gears 13, 14, by means of ball bearings 18', 19' and is mounted relative to the hollow pinion 22 by means of a further bearing 23. The output internal gear 14 is provided with an output shaft portion 14' to which a coupling flange or the like for the driven tool can be attached. The output shaft portion 14' will be constructed separately from gear 14 and be affixed thereto by any suitable means such as, for example, by screws.

The embodiment of in FIG. 2*a* also employs a closed-circuit holding brake 24. The lining 25 of brake 24 may be brought into or released from contact with a cooperating surface on a ring extension 26 of hollow pinion 22. The braking moment of brake 24 expediently exceeds by a multiple the rated moment of drive motor 4 thus permitting brake 24 to be employed as a safety brake.

As shown in FIG. 2*b*, in order to achieve an axially shortened design, drive motor 4 can alternatively be supported on the exterior of casing 2 and be directly coupled by means of coupling 27, to either hollow pinion 22 (as shown) or planet carrier 8.

If the hollow shaft 1 is to rotate with the driven tool it will be coupled, in an appropriate manner, to the output internal gear 14.

As will be understood by those skilled in the art, the use of a pair of planet wheels 11, as described above, is exemplary. Thus, the Wolfrom planetary gear unit 7 may have more than two of planet wheels 11.

The above-described embodiments of FIGS. 1 and 2 are "slip-on" angular gear units. Such angular gear units have wide utility, i.e., the present invention is not limited to use solely for "hand" gear units.

FIG. 3*a* and 3*b* depicts the present invention applied to a lifting gear unit. In the FIG. 3*a* and 3*b* operating environment, a cover plate 28 and a flange 29 are respectively attached to the opposite end faces of the gear unit housing. The flange 29 supports a tubular extension 30 of shaft 1. The load on the apparatus of FIG. 3 consists of a ball roller spindle drive having a stationary, i.e., non-rotating, spindle 31. The output internal gear 14 of the drive unit, or the co-rotating hollow shaft 1, acts as the spindle nut of the ball roller spindle drive. The end 32 of the ball roller spindle 31 is provided with a fork or ball type coupling. A fork 33, which receives a forked head 34, is provided at the other end of the geared motor unit, i.e., opposite to the ball roller spindle drive. Fork 33 serves as a torque support, i.e., a torsion lock. A cover, in the form of a bellows 35 or a spiral spring 36, is provided between end flange 28 and the forked or ball head 32. A limit switch, not shown, may be provided on the tubular extension 30 in order to determine the end-of-stroke positions of ball roller spindle 31. The hollow shaft 1 may be in the form of a profiled hollow shaft which receives multiple-splined or polygonal shafts which are capable of linear movement. Pneumatic or hydraulic cylinders, or insertable or special shafts, can also be received in the hollow shaft 1 depending on specific requirements.

The present invention is characterized by a space-saving design, i.e., a high degree of volumetric efficiency, and by light weight. Also, a geared motor in accordance with the invention has great positioning accuracy coupled with very high actuating power. The geared motor of the invention permits a large, unobstructed hollow shaft passage having no disturbing edges. The member which defines this hollow shaft passage may be a co-rotating or stationary hollow shaft through which power, control cables and/or material can be supplied.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Apparatus for transmitting a rotational motion from a drive shaft of a servo motor to a load, said apparatus comprising:

a tubular shaft having an axis and at least in part defining an open ended, linear passage extending entirely through said apparatus for establishing a fluidic, mechanical or electrical communication with the load;

planetary gear means being disposed generally concentrically with respect to said tubular shaft, said planetary gear means including:

a planet carrier mounted for rotation about said tubular shaft;

a plurality of planet wheels supported on said carrier;

coupling means for coupling the drive shaft to said planetary gear means to cause rotation of said carrier and planet wheels;

housing defining means extending at least partly around said planetary gear means whereby said planetary gear means is disposed between said housing defining means and said tubular shaft, said housing defining means being stationary relative to the servo motor;

a first internal gear fixed to said housing defining means, said first internal gear being coaxial with said tubular shaft and being engaged by said plural planet wheels; and a second internal gear disposed axially behind the first internal gear between said housing defining means and said tubular shaft, said second internal gear being coaxial with said tubular shaft and being engaged and driven by said planet wheels and driving said load.

2. The apparatus of claim 1, wherein said tubular shaft is connected with said second internal gear.

3. The apparatus of claim 1, wherein said tubular shaft is connected with said housing defining means.

4. The apparatus of claim 1, wherein said drive shaft is a hollow shaft.

5. The apparatus of claim 4, wherein said planet wheels are in direct engagement with said drive shaft.

6. The apparatus of claim 1, wherein said planet carrier is provided with a coupling gear which is in direct engagement with said drive shaft.

7. The apparatus of claim 1, wherein the servo motor is a ring-shaped motor disposed coaxially around said tubular shaft.

8. The apparatus of claim 1, wherein said servo motor is disposed within said housing defining means.

9. The apparatus of claim 1, wherein said servo motor is mounted on the exterior of said housing defining means.

10. The apparatus of claim 1, further comprising resolver means for providing output signals commensurate with the orientation and rotational speed of the load.

11. The apparatus of claim 1, wherein said servo motor is provided with brake means selectively preventing rotation of said planetary gear means.

12. The apparatus of claim 11, wherein said brake means provides a braking moment which exceeds the rated moment of said servo motor.

13. The apparatus of claim 11 further comprising axially and radially acting bearing means for supporting said second internal gear from said stationary housing defining means, and wherein said second internal gear rotates about said tubular shaft.

14. The apparatus of claim 1 further comprising:

means supporting said housing defining means for rotation about a second axis which is angularly oriented with respect to the axis of said tubular shaft; and means for selectively causing rotation of said housing defining means about said second axis.

15. The apparatus of claim 1 wherein the hollow shaft takes up a ball roller spindle, said second internal gear acting as a spindle nut for the ball roller spindle to provide a ball roller spindle drive.

16. Apparatus for use with a rotatable drive shaft of the type having a drive shaft gear affixed thereto, said apparatus imparting motion to a load during rotation of the drive shaft while simultaneously permitting the establishment of fluidic, mechanical or electrical communication with the load, said apparatus comprising:

a tubular shaft having an axis and at least in part defining an open-ended, linear passage extending entirely through said apparatus;

planetary gear means, said planetary gear means being disposed generally concentrically with respect to said tubular shaft, said planetary gear means including:

a planet carrier which is in direct driving engagement with the drive shaft gear, said planet carrier being mounted for rotation about said tubular shaft;

a plurality of non-coaxial planet wheels supported on said carrier; and coupling means for coupling the drive shaft to said carrier to cause rotation of said carrier planet wheels, said coupling means including a coupling gear which is in direct meshing engagement with the drive shaft gear, said coupling means not being in meshing engagement with said planet gears;

stationary housing defining means extending at least partly around said planetary gear means whereby said planetary gear means is disposed between said housing defining means and said tubular shaft;

a first internal gear fixed to said housing defining means, said first internal gear being coaxial with said tubular shaft and being engaged by each of said plural planet wheels;

a second internal gear disposed between said housing defining means and said tubular shaft, said second internal gear being coaxial with said tubular shaft and being engaged and driven by each of said plural planet wheels; and means for connecting a load to said second gear.

17. Apparatus for use with a rotatable drive shaft of the type having a drive shaft gear affixed thereto, said apparatus imparting motion to a load during rotation of the drive shaft while simultaneously permitting the establishment of fluidic, mechanical or electrical communication with the load, said apparatus comprising:

a tubular shaft having an axis and at least in part defining an open-ended linear passage extending entirely through said apparatus;

planetary gear means, said planetary gear means being disposed generally concentrically with respect to said tubular shaft, said planetary gear means including:

a planet carrier which is in direct driving engagement with the drive shaft gear, said planet carrier being mounted for rotation about said tubular shaft; and a plurality of planet wheels supported on said carrier, said planet wheels being in direct meshing engagement with the drive shaft gear to thereby cause rotation of said carrier and planet wheels during rotation of the drive shaft;

stationary housing defining means extending at least partly around said planetary gear means whereby said planetary gear means is disposed between said housing defining means and said tubular shaft;

a first internal gear fixed to said housing defining means, said first internal gear being coaxial with said tubular shaft and being engaged by said plural planet wheels; and a second internal gear disposed between said housing defining means and said tubular shaft, said second internal gear being coaxial with said tubular shaft and being engaged and driven by said planet wheels; and means for connecting a load to said second internal gear.

18. Apparatus for transmitting a rotational motion from a drive shaft to a load, said apparatus comprising:

a tubular shaft having an axis and defining an open ended passage extending therethrough for establishing a fluidic, mechanical or electrical communication with the load;

planetary gear means being disposed generally concentrically with respect to said tubular shaft, said planetary gear means comprising a five wheeled helical planetary gear means and including:

a planet carrier mounted for rotation about said tubular shaft;

five planet wheels supported on said carrier;

coupling means for coupling the drive shaft to said planetary gear means to cause rotation of said carrier and planet wheels;

housing defining means extending at least partly around said planetary gear means whereby said planetary gear means is disposed between said housing defining means and said tubular shaft;

a first internal gear fixed to said housing defining means, said first internal gear being coaxial with said tubular shaft and being engaged by said plural planet wheels; and a second internal gear disposed axially behind the first internal gear between said housing defining means and said tubular shaft, said second internal gear being coaxial with said tubular shaft and being engaged and driven by said planet wheels and driving said load.

* * * * *

UNITED STATES PATENT AND TRADEMARK OFFICE
CERTIFICATE OF CORRECTION

PATENT NO. : 5,833,569
DATED : November 10, 1998
INVENTOR(S) : Schnell

It is certified that error appears in the above-identified patent and that said Letters Patent is hereby corrected as shown below:

Column 5,
Line 66, delete "11" and insert -- 1 --.

Signed and Sealed this

Fifteenth Day of October, 2002

Attest:

Attesting Officer

JAMES E. ROGAN
Director of the United States Patent and Trademark Office